(12) United States Patent
Smith et al.

(10) Patent No.: US 6,912,322 B2
(45) Date of Patent: Jun. 28, 2005

(54) ADAPTIVE PROCESS FOR REMOVING STREAKS IN MULTI-BAND DIGITAL IMAGES

(75) Inventors: Steven L. Smith, Rochester, NY (US); Robert D. Fiete, Fairport, NY (US)

(73) Assignee: ITT Manufacturing Enterprises Inc., Wilmington, DE (US)

(*) Notice: Subject to any disclaimer, the term of this patent is extended or adjusted under 35 U.S.C. 154(b) by 476 days.

(21) Appl. No.: 09/736,812

(22) Filed: Dec. 14, 2000

(65) Prior Publication Data

US 2002/0114533 A1 Aug. 22, 2002

(51) Int. Cl.[7] .............................. G06K 9/40
(52) U.S. Cl. .................................. 382/275
(58) Field of Search .................. 382/54, 205, 232, 382/254, 250, 260, 270, 275, 276, 283; 348/248, 249

(56) References Cited

U.S. PATENT DOCUMENTS

| | | | |
|---|---|---|---|
| 5,065,444 A | 11/1991 | Garber | 382/54 |
| 5,729,631 A * | 3/1998 | Wober et al. | 382/232 |
| 5,881,182 A | 3/1999 | Fiete et al. | 382/275 |
| 6,496,286 B1 * | 12/2002 | Yamazaki | 358/514 |

* cited by examiner

*Primary Examiner*—Jon Chang
*Assistant Examiner*—Wes Tucker
(74) *Attorney, Agent, or Firm*—RatnerPrestia

(57) ABSTRACT

A method of removing streaks from multi-band digital images is presented in which a multi-band image is transformed to an advantageous spectral space, in which a streak removal operation is applied to the image in the advantageous spectral space. The streak removal operation is a method of removing columnar streaks from a multi-band digital image of the type in which it is assumed that pixels in a predetermined spatial and spectral region near a given pixel are strongly related to each other and employing gain and offset values to compute streak removal information, a test is performed for a strong relation between the pixels in a predetermined region spatially and spectrally near a given pixel and streak removal information is computed only if such a strong relationship exists, whereby image content that does not extend the full length of the image in the column direction will not be interpreted as a streak.

11 Claims, 5 Drawing Sheets

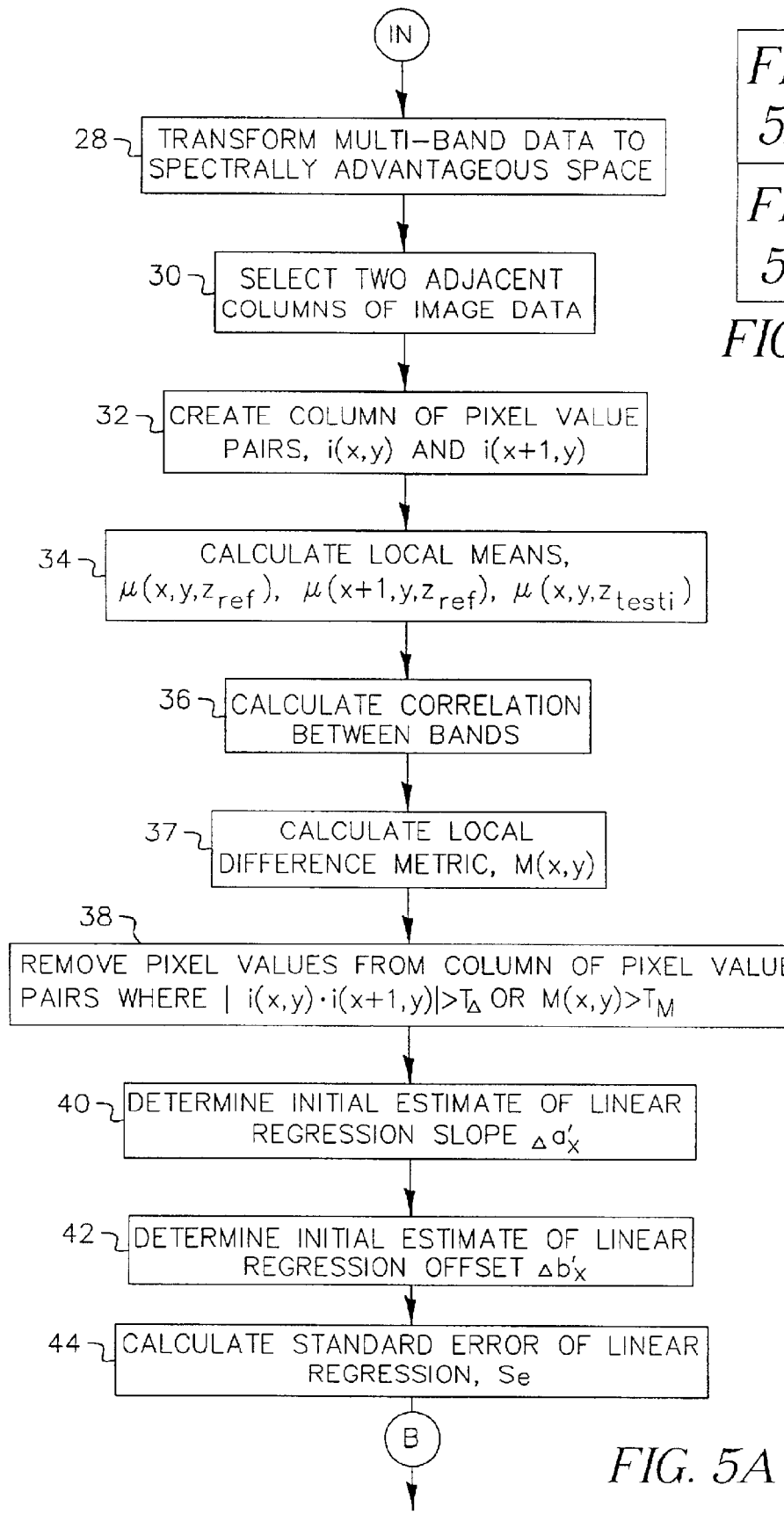

ADAPTIVE PROCESS FOR REMOVING STREAKS IN MULTI-BAND DIGITAL IMAGES

FIELD OF THE INVENTION

The invention relates generally to the field of image processing, and in particular to an image processing method for removing streaks in multi-band digital images (images consisting of three or more spectral bands). The invention is particularly useful in removing streaking in multi-band digital images that are acquired by a linear image sensing array, but may also be used to remove streaks in conventional color film that are caused by the camera or processing equipment.

BACKGROUND OF THE INVENTION

Multi-band imaging sensors typically are designed such that each band of the imaging system is sensitive to a pass-band of electromagnetic radiation. For example, a standard color imaging system consists of three bands (or arrays of detectors) sensitive to red, green, and blue light, respectively. Imaging systems such as multi-spectral or hyper-spectral systems contain many detector bands. These systems may contain spectral bands sensitive to non-visible parts of the electromagnetic spectrum such as to NIR (near-infrared), SWIR (short-wave infrared) or MWIR (mid-wave infrared) in addition to bands sensitive to red, green, and blue light. Color composite imagery is commonly formed from multi-spectral imagery and hyper-spectral imagery by mapping three selected bands to the red, green, and blue bands of an output display device such as a video monitor, or a digital color printer.

Every detector of a given spectral band in an electronic image sensor, such as a CCD image sensor, may have a different response function that relates the input intensity of light (or other electromagnetic radiation) to a pixel value in the digital image. This response function can change with time or operating temperature. Image sensors are calibrated such that each detector in a given spectral band, has the same response for the same input intensity (illumination radiance). The calibration is generally performed by illuminating each detector of the spectral band with a given radiance from a calibration lamp and then recording the signal from each detector to estimate the response function of the detector. The response function for each detector is used to equalize the output of all of the detectors such that a uniform illumination across all of the detectors will produce a uniform output. This calibration is typically performed separately for each band of a multi-band imaging system.

FIG. 1 shows a schematic of an image acquired by a linear image sensing arrays. In such an image, if errors in estimating the response curve of a detector are different from the errors in the response curve of an adjacent detector, the detector responses will not be equalized and streaking 2 will appear in the image along the scan direction indicated by arrow A. Since these calibration errors can occur within each band of a spectral imaging system, and several bands of a spectral imaging system are often combined together to form a color composite image, the streaking 2 may appear in various colors. Often to achieve a very long array, several image sensor chips are joined together to form a single linear image sensor. Slight differences in response between chips (due to variations in sensor chip manufacturing, or sensor electronics processing) can lead to large calibration errors between chips. When calibration errors occur between chips, the streaking is generally referred to as banding, as illustrated at reference numeral 4.

Even when the detectors are calibrated to minimize the streaking in the image, some errors from the calibration process are unavoidable. Typically, a spectral filter is placed on a given detector, or sensor chip to create an imaging band sensitive to a specific region in the electromagnetic spectrum. Depending on the architecture of the sensor array, it may be necessary to have several spectral filters of the same bandpass to cover the entire array. Often, due to the variations in the spectral filter manufacturing process, the filters that are placed over the detectors in a given band may be slightly different in spectral bandpass and spectral shape. In addition, material variations, and the angle of incidence of light on a spectral filter, causes additional spectral variations depending on the position of the spectral filter on the sensor array. As a result, each detector within a spectral band is sensitive to a slightly different spectrum of light, but they are all calibrated using the same calibration lamp with a broad, non-uniform spectrum. Since the scene spectrum is unknown, the calibration process assumes that the spectrum of the calibration lamp and scene are identical. The spectrum of the calibration lamp will usually be somewhat different than the spectrum of the scene being imaged, hence calibration errors will occur. This calibration error is also referred to as spectral banding. Calibration errors also occur because the calibration process includes an incomplete model of the complete optical process and because the response function for each detector changes over time and operating temperature.

Streaking can be seen in uniform areas of an image acquired by a linear detector and become very apparent when the contrast of the image is enhanced. Calibration differences between the red, green, and blue detectors of color imaging systems (or any of the bands in a multi-spectral or hyper-spectral imaging system) produce streaks of varying colors in the composite color image. These streaks not only reduce the aesthetic quality of digital images but can impact the interpretability of features in the images. Streaking also severely degrades the performance of pattern recognition, feature extraction algorithms, image classification algorithms and automated or semi-automated target recognition algorithms.

Streaks can be attenuated by reducing the contrast of each image band or by blurring each image band in a direction perpendicular to the streaking, but these methods degrade the quality of the overall image. Previously developed algorithms designed to remove streaks from digital imagery while preserving the sharpness and contrast of the image were designed to remove streaks on single band imagery; not on multi-band imagery. These algorithms only take into account spatial information present in the image to remove streaks. No attempt is made to examine additional color information or spectral correlation available in multi-spectral or hyper-spectral imagery to remove streaks. As a result, when applying these techniques to multi-band imagery, these algorithms do not completely remove all of the color streaks present in the original image and may introduce objectionable color streaks or bands as artifacts. These algorithms do not preserve and/or restore the overall color fidelity of the image. In addition, applying algorithms designed to remove streaks from single band imagery on color or multi-spectral imagery, is a non-optimal method for streak removal for color imagery or multi-spectral imagery, as these algorithms do not use all of the available information that is present in multi-band imagery during the streak removal process.

U.S. Pat. No. 5,065,444, issued Nov. 12, 1991, to Garber discloses a method of removing streaks from single band digital images by assuming that pixels in a predetermined region are strongly correlated, examining the pixels in the region, computing the difference between the pixels in the region, thresholding the pixel differences lower than a predetermined value, computing a gain and offset value from the distribution of differences, and using the gain and offset value to remove the streaking. Methods that assume a strong correlation between pixels that are near each other, such as the one disclosed by Garber will interpret scene variations as streaks and produce additional streaking artifacts in the image as a result of attempting to remove existing streaks. FIG. 2a shows an image having streaks 2 and linear features 6 that are in the same direction as the streaks. As shown in FIG. 2b, the correction of the streaks 2 using the method taught by Garber removes the streaks 2, but results in additional streaking artifacts 8. Applying the method by Garber to each spectral band of multi-band images will result in objectionable color streaks and color banding artifacts.

U.S. Pat. No. 5,881,182, issued Mar. 9, 1999, to Fiete et al., which is incorporated herein by reference, discloses a method of removing streaks by comparing the means between a local window region of two columns of data in the imagery to determine if a streak was present, and presenting statistical methods to calculate a gain and offset to remove the streaks. To apply this method on spectral or color imagery (imagery that consists of more than one spectral band), this method would be applied independently to each band of the spectral imagery, and then the bands of the spectral imagery are recombined to form a color composite image. The method of Fiete et al. looks only at the spatial and luminance information within each band independently; hence calibration differences between each of the bands may not be corrected. As a result, when applied independently to each band of a multi-band image, and then combining these spectral bands together to form a color composite image, all of the color streaks may not be completely removed from the imagery. Yet, when the three spectral bands from a multi-band spectral image, each containing some unremoved streaks and slight banding artifacts, are combined to form a composite three band color image, these artifacts manifest to form objectionable color streaks and color banding in the color composite imagery. The method of Fiete et al. does not adequately remove color streaks from multi-band imagery.

There is a need therefore for an improved digital image processing method for removing streaks in color or multi-band images. The method presented here is an improvement of the method of Fiete et. al. to better remove color streaks and bands from multi-band imagery.

SUMMARY OF THE INVENTION

The object of the present invention is achieved in a method of removing columnar streaks from a multi-band digital image of the type in which the spectral bands are transformed to an advantageous spectral space, the streak removal operation is performed in the advantageous spectral space, and then the bands are transformed back into the original space. The method of removing columnar streaks is a method of the type in which it is assumed that pixels in a predetermined region near a given pixel within each transformed band are strongly related to each other and employing gain and offset values to compute streak removal information, by testing for a strong relation between the pixels in a predetermined region near a given pixel and computing streak removal information only if such a strong relationship exists, whereby image content that does not extend the full length of the image in the columnar direction will not be interpreted as a streak.

The method of the present invention adaptively removes streaking, as well as banding, in multi-band digital images without reducing the sharpness, contrast, or color fidelity of the image. Streaking occurs in multi-band image output from linear scanners and is generally caused by differences in the responsivity of detectors or amplifiers or non-uniform spectral response of filters. The method disclosed detects pixel locations in the image where pixel-to-pixel differences (both within bands and between bands) caused by streaking can be distinguished from normal variations in the scene data. A linear regression is performed between each spatially and spectrally adjacent pixel in a direction perpendicular to the streaking at the detected locations. A statistical outlier analysis is performed on the predicted values to remove the pixels that are not from the streaking. A second linear regression is performed to calculate the slope and offset values. The slope is set to unity if it is not statistically different from unity, and the offset is set to zero if it is not statistically different from zero. The slope and offset values are then used to remove the streaking from the corresponding line of image data.

ADVANTAGEOUS EFFECT OF THE INVENTION

This invention adaptively removes streaking in multi-band digital image by using both spatial and spectral information within the image. By using spectral information present in multi-band imagery, better determinations can be made of streaks than by using just spatial information present in just one band of the imagery.

The streak removal operation consists of transforming the multi-band data to an advantageous spectral space, testing for a strong correlation between the pixels in a predetermined region and computing streak removal information only if such a strong relationship exists, and the transforming back into the original spectral space. This process will remove the residual streaks that appear even after a calibration is performed on the imaging sensor. This method does not reduce the contrast, sharpness, and preserves and/or improves the color fidelity of the image.

DETAILED DESCRIPTION OF THE INVENTION

Figure 1:
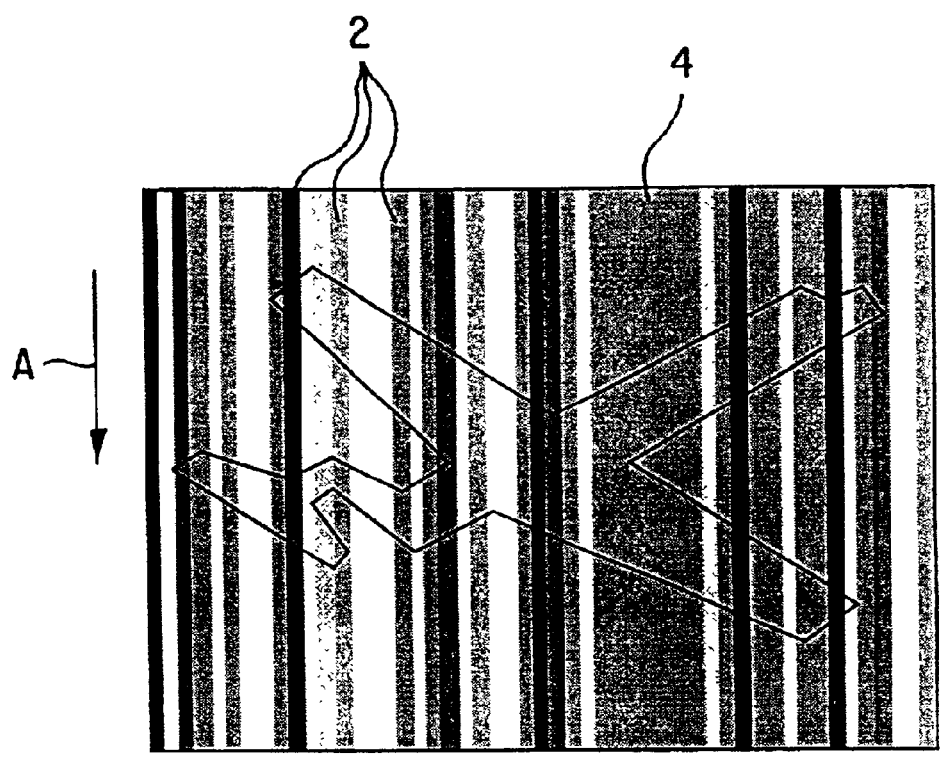
FIG. 1 illustrates the streaking artifact in an image.
Figure 2A:
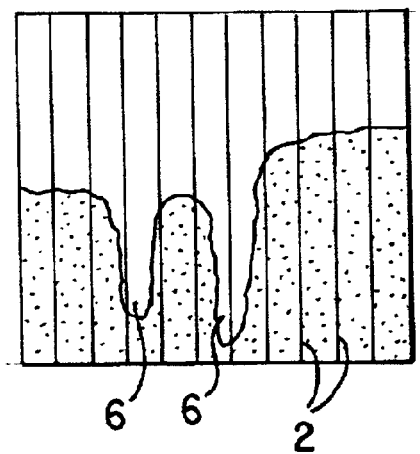
FIGS. 2(a)–2(b) illustrates the artifacts produced by methods that assume that pixels in a predetermined region near a given pixel are strongly related to each other.
Figure 2B:
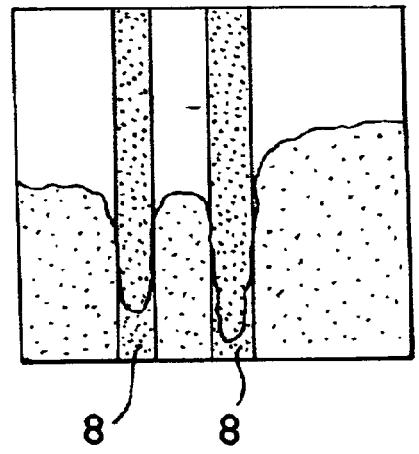
Figure 3:
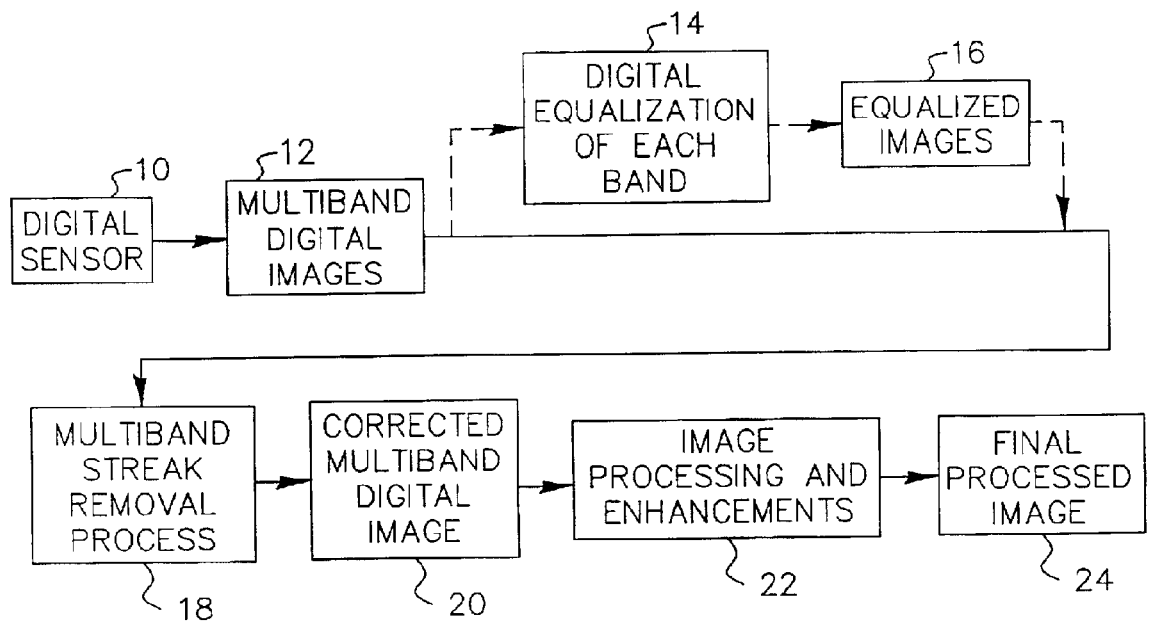
FIG. 3 is a diagram showing an image processing chain using the present invention.

The streak removal process of the present invention can be employed in a typical image processing chain, such as the one shown in FIG. 3. A digital sensor 10, e.g. a linear scanner used in a camera system or a photographic scanner, outputs a multi-band digital image 12. If the detectors have gone through a calibration process, then each band of the multi-band digital image 12 may go through a detector equalization process 14 to produce an equalized multi-band image 16. Both the digital image 12 and the equalized image 16 will contain streaks 2 as shown in FIG. 1. The digital multi-band image 12 or the equalized digital multi-band image 16 is processed through the multi-band streak removal process 18 to produce a corrected digital multi-band image 20 that has the streaks removed. This corrected digital image 20 is then processed through the nominal image processing chain and enhancements 22 to produce the final processed image 24. Without the streak removal process 18, the image processing and enhancements 22 may actually reduce the quality of the final processed image 24, especially if the digital image 12 is low in contrast or if the image processing and enhancements 22 includes a feature extraction algorithm, or an automated computer information extraction algorithm.

If the original image was a photographic color image having streaks or scratches, for example the scratches seen in old movie film, the images may be scanned in a high quality scanner and the streaks or scratches removed by the method of the present invention.

Figure 4:
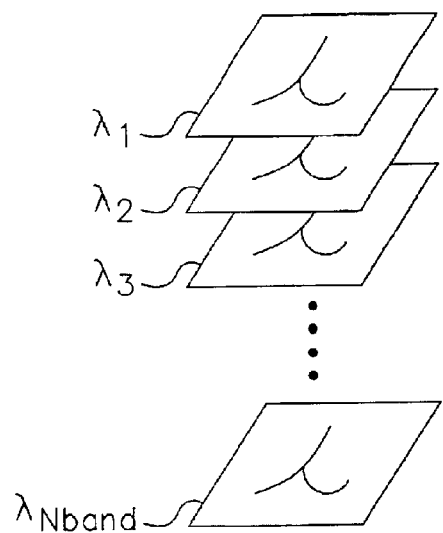
FIG. 4 illustrates the individual spectral bands that make up a multi-band image.

The preferred embodiment of the multi-band streak removal process described below is presented in the context of removing streaks from a multi-band sensor system. A single-band sensor system collects a single image that represents a single spectral band of the scene. A multi-band sensor system collects a total of $N_{band}$ multiple images, each acquired at different spectral bands denoted ($\lambda_1$, $\lambda_2$, $\lambda_3$, ..., $\lambda_{Nband}$), as shown in FIG. 4. If the multi-band sensor systems contain more than three spectral bands, then at the completion of the spectral band removal operation, any three of the spectral bands may be selected to create a color composite image for output display. (i.e. mapped to the red, green, and blue channels of an output device) or a subset of the $N_{band}$ images may be selected for input into an automated information extraction algorithm.

Presented below is the single-band streak removal operation 18. For the discussion of this invention it will be assumed that the streaks occur in columnar direction of each band of the multi-band digital image 12. The pixel at column coordinate x and row coordinate y and band location z has a digital count value $i(x,y,z)$. If $d_x$ is the detector for column x, then the response curve for detector $d_x$ in the digital sensor 10 can be modeled as a linear function of the input illumination radiance, thus $$i(x,y,z)=a_x I(x,y,z)+b_x, \quad (1)$$

where $I(x,y,z)$ is the intensity of the illumination radiance at location $(x,y,z)$ in the image, $a_x$ is the gain for detector $d_x$, and $b_x$ is the bias for detector $d_x$.

Streaks occur in the digital image 12 because adjacent detectors in the digital sensor 10 have different response curves. The difference $\Delta(x,y,z)$ between adjacent pixels within band z is given by $$\Delta(x,y,z)=i(x,y,z)-i(x+1,y,z)=a_x I(x,y,z)+b_x-a_{x+1}I(x+1,y,z)-b_{x+1}, \quad (2)$$

and is dependent on the detector response as well as the difference between the illumination radiance incident on the adjacent pixels. If the detectors $d_x$ and $d_{x+1}$ have the same response curves, i.e. if $a_x=a_{x+1}$ and $b_x=b_{x+1}$, then $$\Delta(x,y,z)=i(x,y,z)-i(x+1,y,z)=a_x[I(x,y,z)-I(x+1,y,z)], \quad (3)$$

and the difference between $i(x,y,z)$ and $i(x+1,y,z)$ is proportional to the difference between the illumination radiance incident on the adjacent pixels, which is desired, and no streaks due to sensor calibration errors will be present.

If $I(x,y,z)=I(x+1,y,z)$ in Eq. (2) then $$\Delta(x,y,z)=i(x,y,z)-i(x+1,y,z)=[a_x-a_{x+1}]I(x,y,z)+[b_x-b_{x+1}], \quad (4)$$

and the difference between $i(x,y,z)$ and $i(x+1,y,z)$ is entirely from the different response curves between detectors $d_x$ and $d_{x+1}$.

If $I(x+1,y,z)$ is substituted for $I(x,y,z)$ using Eq. (3) then $$i(x,y,z) = \quad (5)$$
$$a_x \frac{i(x+1,y,z)-b_{x+1}}{a_{x+1}}+b_x = \frac{a_x}{a_{x+1}}i(x+1,y,z)+\left[b_x-\frac{a_x}{a_{x+1}}b_{x+1}\right].$$

If $\Delta a_x \equiv \frac{a_x}{a_{x+1}}$ and $\Delta b_x \equiv b_x - \frac{a_x}{a_{x+1}}b_{x+1}$ $$i(x,y)=\Delta a_x i(x+1,y,z)+\Delta b_x \quad (6)$$

and $i(x,y,z)$ is just a linear transformation of $i(x+1y,z)$ with a slope $\Delta a_x$ and offset $\Delta b_x$. By determining $\Delta a_x$ and $\Delta b_x$, the streaking between columns x and x+1 can be removed if the pixel count values $i(x+1,y,z)$ are replaced with $\hat{i}(x+1,y,z)$ where $$\hat{i}(x+1,y,z)=\Delta a_x i(x+1,y,z)+\Delta b_x. \quad (7)$$

The difference between adjacent pixels is now $$\Delta(x,y,z)=i(x,y,z)-\hat{i}(x+1,y,z)=a_x I(x,y,z)+b_x-\{\Delta a_x[a_{x+1}I(x+1,y,z)+b_{x+1}]+\Delta b_x\}$$

$$= a_x I(x,y,z)+b_x-\left\{\frac{a_x}{a_{x+1}}[a_{x+1}I(x+1,y,z)+b_{x+1}]+b_x-\frac{a_x}{a_{x+1}}b_{x-1}\right\}$$

$$=a_x[I(x,y,z)-I(x+1,y,z)], \quad (8)$$

which is the desired result from Eq. (3), hence no streaks due to sensor calibration error will be present.

Methods that determine $\Delta a_x$ and $\Delta b_x$ by assuming that the illumination radiance is always approximately equal in a predetermined region near pixel $i(x,y,z)$, e.g. $I(x,y,z) \approx I(x+1,y,z)$, such as the one disclosed in U.S. Pat. No. 5,065,444, will generate poor estimates of $\Delta a_x$ and $\Delta b_x$ where $I(x,y,z) \neq I(x+1,y,z)$ and artifacts will occur. Methods that determine $\Delta a_x$ and $\Delta b_x$ by testing for strong relationships in spatial features within a single band and computing $\Delta a_x$ and $\Delta b_x$ only from pixels where $I(x,y,z) \approx I(x+1,y,z)$, such as the one disclosed in U.S. Pat. No. 5,881,122 do not use any available information present in the other bands. Spectral streaking will not be removed using these methods.

According to the present invention, spectral streaks will be removed if a spectral transformation is first performed on each imaging band as a pre-processing step to transform the data into a spectrally advantageous space. In general, the spectral transformation will take the form:

$$i'(x,y,z')=\theta[i(x,y,z)], \quad (9)$$

where $\partial$ is a transformation operator, operating on each of the spectral bands of the input image, $i(x,y,z)$. In the preferred embodiment, this transformation is a linear combination of the original bands, given by $$i'(x,y,z') = \sum_{z=1}^{N_{band}} \alpha_{z',z} i(x,y,z) \quad (10)$$

where $\alpha_{z',z}$ are the linear transformation coefficients. In matrix notation this transform is given by $$\vec{i}'(x,y,z')=\tilde{A}\vec{i}(x,y,z) \quad (11)$$

where $\tilde{A}$ is the $N_{band} \times N_{band}$ transformation matrix. The transformation combines the radiometric and spectral information from each band into new bands, such that when streaks are removed from the transformed data, the spectral information is included. The optimal transformation to use will be dependent on the number of bands of data, the spectral bandpass of each of the imaging bands, and other imaging band dependent sensor characteristics.

If the multi-band image contains three bands, or three pre-selected bands from the multi-band image are desired to form a color composite output, then the following transformation is used on the data in the preferred embodiment to minimize color streaking artifacts:

$$i'(x,y,1)=0.2999i(x,y,1)+0.587i(x,y,2)+0.114i(x,y,3) \quad (12)$$

$$i'(x,y,2)=-0.1687i(x,y,1)-0.3313i(x,y,2)+0.500i(x,y,3) \quad (13)$$

$$i'(x,y,3)=0.500i(x,y,1)-0.4187i(x,y,2)-0.0813i(x,y,3). \quad (14)$$

Figure 5B:
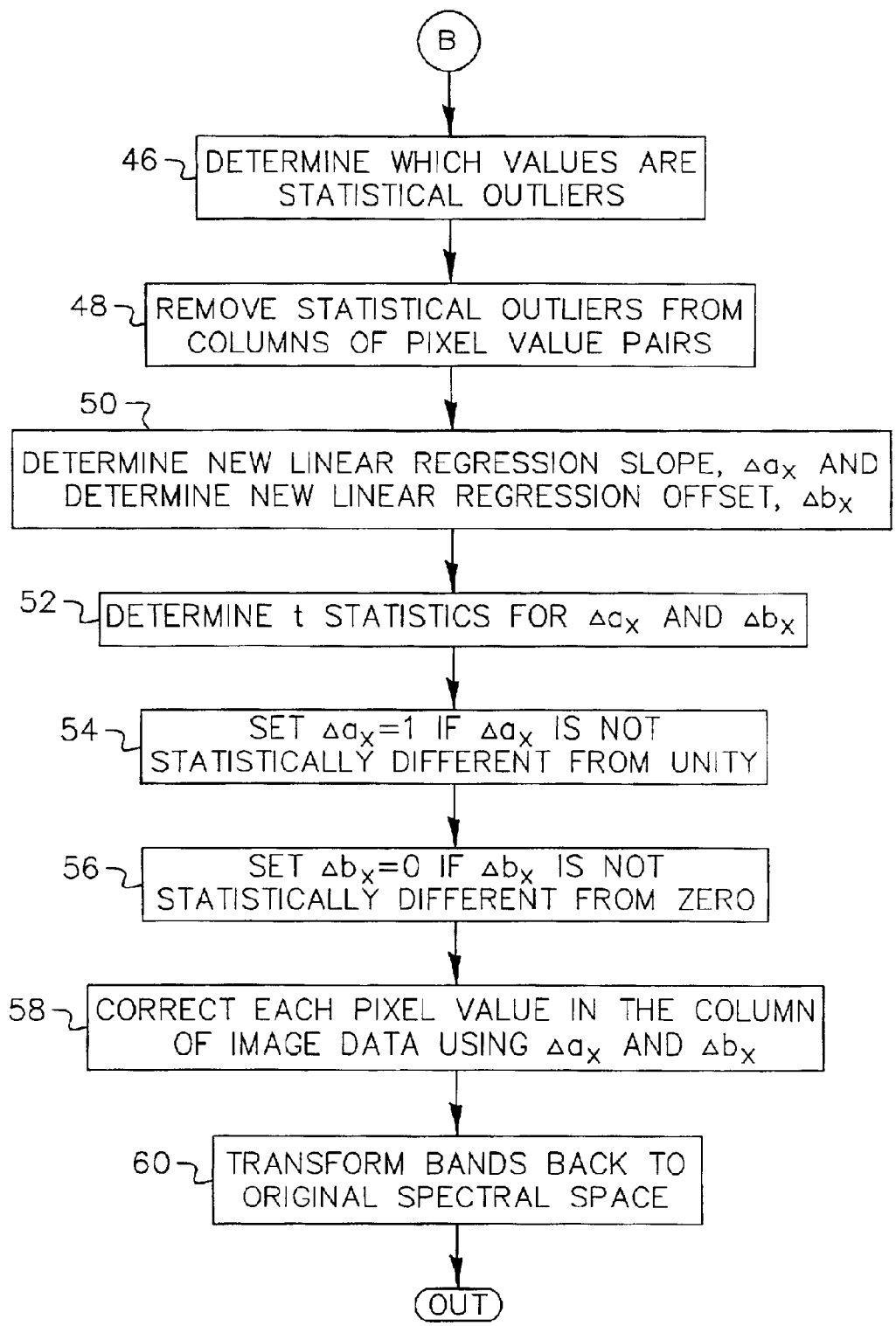
FIG. 5, made up of FIG. 5(a) and FIG. 5(b), is a flow chart of the entire multi-band streak removal process according to the present invention
Figure 6:
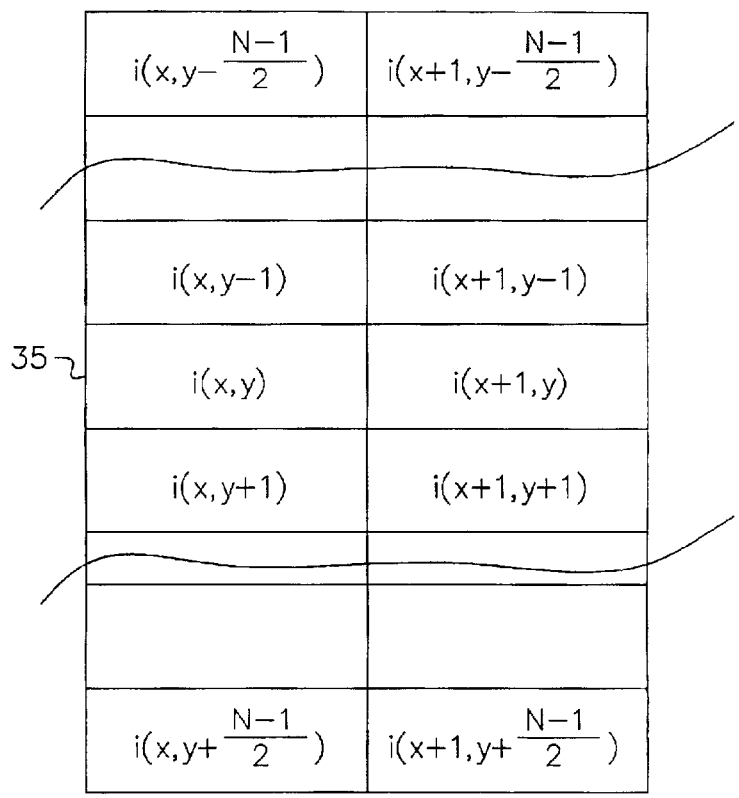
FIG. 6 illustrates a digital mask that is used to test for pixels that are strongly related to each other in a predetermined region.

Once the spectral transformation is performed, a streak removal operation is performed on each of the spectrally transformed bands of i'(x,y,z') one band at a time using information from the all other spectral bands in the streak removal process. Let $i'(x,y,z_{ref})$ refer to the band currently undergoing the streak removal operation, where $Z_{ref}$ is referred to as the reference band. Let $i'(x,y,z_{testi})$ refer to all other bands in the image, excluding the reference bands ($z_{ref}$). These bands shall be referred to as the test bands. In the streak removal operation performed on an individual band, a test is performed for a strong relationship in spatial features between spectrally and spatially correlated pixels and $\Delta a_x$ and $\Delta b_x$ are computed only from those pixels where $i'(x,y,z_{ref}) \approx i'(x+1y,z_{ref})$ and $i'(x,y,z_{testid}) \approx i(x+1,y,z_{ref})$ thus preventing artifacts due to the processing to remove streaking from occurring and allowing spatial information from other bands that are highly correlated to the current band to be used in the streak removal process. A schematic of the streak removal process 18 disclosed in this invention is shown in FIG. 5. First two adjacent columns of image data are selected 30 from band $z_{ref}$. Next, a column of pixel value pairs representing the pixel values of the adjacent pixels of the two columns is formed 32. Next a pair of columns of local mean values representing the mean values of pixels in an N pixel window for each of the adjacent columns of image data is formed 34. The local means $\mu_{ref}(x,y,z_{ref})$ and $\mu_{ref}(x+1,y,z_{ref})$ are calculated using $$\mu_{ref}(x, y, z_{ref}) = \frac{1}{N} \sum_{n=-\frac{(N-1)}{2}}^{\frac{(N-1)}{2}} i'(x, y+n, z_{ref}) \quad (15)$$

$$\mu_{ref}(x+1, y, z_{ref}) = \frac{1}{N} \sum_{n=-\frac{(N-1)}{2}}^{\frac{(N-1)}{2}} i'(x+1, y+n, z_{ref}) \quad (16)$$

$$\mu_{testi}(x, y, z_{testi}) = \frac{1}{N} \sum_{n=-\frac{(N-1)}{2}}^{\frac{(N-1)}{2}} i'(x, y+n, z_{testi}) \quad (17)$$

where N is the window length. To determine if $i'(x,y,z_{ref}) \approx i'(x+1,y,z_{ref})$, a mask, such as the mask 35 shown in FIG. 6, is centered at pixel $i'(x,y,z_{ref})$ and convolved with the image. Pixels in the first and last (N−1)/2 rows of the image will not be used to determine $\Delta a_x$ and $\Delta b_x$.

Next, a test for similarity between bands in the local pixel regions is also performed. First a bias, $B_i$, is added to the pixel values in each of the local windows in the bands $z_{testi}$ used to calculate the mean in Eq. (17) such that $\mu_{ref} = \mu_{testi}$. Next, a correlation is calculated 36 over the local window region (x,y+n) between each test band $z_{testi}$ and the reference band $z_{ref}$, given by $$Corr_i = \frac{\sum_n [i'(x, y+n, z_{ref}) - \mu_{ref}] * [i'(x, y+n, z_{testi}) - \mu_{testi}]}{\sqrt{\sum_n [i'(x, y+n, z_{ref}) - \mu_{ref}]^2} \sqrt{\sum_n [i'(x, y+n, z_{testi}) - \mu_{testi}]}} \quad (18)$$

Next, a local difference metric $M_{ref}(x,y,z_{ref})$ is calculated that measures the similarity between local pixel regions. A difference metric based on the difference between the mean reduced values is given by $$M_{ref}(x, y, z_{ref}) = \frac{1}{N} \sqrt{\sum_{n=-\frac{(N-1)}{2}}^{\frac{(N-1)}{2}} \{[i'(x, y+n, z_{ref}) - \mu(x, y, z_{ref})] - [i'(x+1, y+n, z_{ref}) - \mu(x+1, y, z_{ref})]\}^2} \quad (19)$$

If the calculated correlation, $Corr_i > T_C$, where $T_C$ is the correlation threshold, for a given test band ($Z_{testi}$), then an additional difference metric $M_{testi}(x,y,z_{testi})$ is calculated:

$$M_{testi}(x, y, z_{testi}) = \frac{1}{N} \sqrt{\sum_{n=-\frac{(N-1)}{2}}^{\frac{(N-1)}{2}} \{[i'_{bias}(x, y+n, z_{testi}) - \mu_{testi}(x, y, z_{testi})] - [i'(x+1, y+n, z_{ref}) - \mu_{testi}(x+1, y, z_{ref})]\}^2} \quad (20)$$

where $i_{bias}(x,y+n,z_{test_i})$ represents the bias adjusted pixels over the local window region. Next, the average local difference metric 37 is calculated:

$$M(x, y, z) = \frac{M_{ref}(x, y, z_{ref}) + \sum_{test_i} M_{test_i}(x, y, z_{test_i})}{N_{bandsC} + 1} \quad (21)$$

where $N_{bandsC}$ are the number of test bands in which $Corr_i > T_C$.

The local pixel regions are similar if $M(x,y,z) < T_M$, where $T_M$ is the difference metric threshold. The optimal value for $T_M$ will depend on the characteristics of the digital sensor 10. A maximum difference threshold, $T_\Delta$, is defined by determining the largest magnitude difference of $\Delta(x,y,z)$ that is possible from calibration differences alone.

To determined the values of $\Delta a_x$ and $\Delta b_x$ in Eq. (7), two columns of pixel values $i_{x,z}(n)$ and pixel values $i_{x+1}(n)$, where n is a counting index, are generated 38 for each row x, where only the k values of $i(x,y,z_{ref})$ and $i(x+1,y,z_{ref})$ that satisfy the conditions $M(x,y,z_{ref}) < T_M$ and $|\Delta(x,y,z_{ref})| < T_\Delta$ are used.

Figure 7:
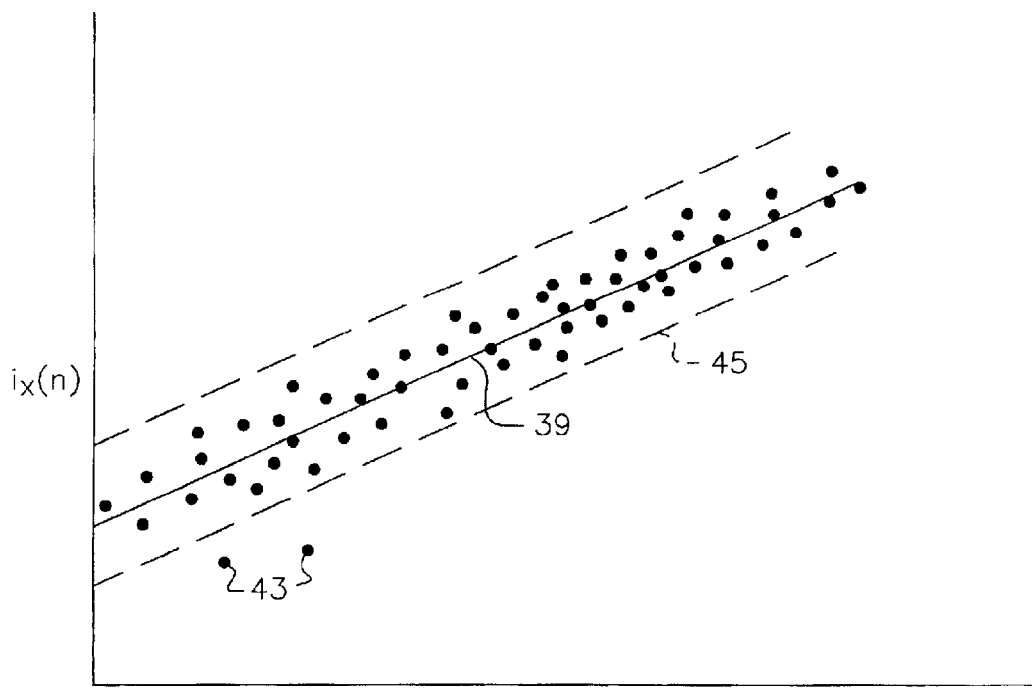
FIG. 7 is a graph illustrating the linear regression with the two adjacent columns of image data, useful in describing the method of the present invention.

Initial estimates of the slope and offset are determined by performing a linear regression between $i_x(n)$ and $i_{x+1}(n)$ to determine the regression line 39 in FIG. 7. The initial estimate of the slope, $\Delta a'_x$, is calculated 40 by $$\Delta a'_x = \frac{k \sum_{n=1}^{k} i_{x+1}(n) i_x(n) - \sum_{n=1}^{k} i_{x+1}(n) \sum_{n=1}^{k} i_x(n)}{k \sum_{n=1}^{k} i^2_{x+1}(n) - \left(\sum_{n=1}^{k} i_{x+1}(n)\right)^2} \quad (22)$$

where k is the total number of elements in $i_x(n)$. The initial estimate of the offset, $\Delta b'_x$, is calculated 42 by $$\Delta b'_x = \frac{\sum_{n=1}^{k} i_x(n) - \Delta a_x \sum_{n=1}^{k} i_{x+1}(n)}{k}. \quad (23)$$

The slope $\Delta a_x$ and offset $\Delta b_x$ for Eq. (7) are determined by performing a second linear regression between $i_x(n)$ and $i_{x+1}(n)$ after the statistical outliers 43 in FIG. 7 have been removed from the estimates of $\Delta a'_x$ and $\Delta b'_x$. The standard error $s_e$ of the linear regression is calculated 44. The statistical outliers 43 will be defined as points lying outside a boundary 45 that is dependent on the standard error of estimate $S_e$, given by $$s_e = \sqrt{\frac{\sum_{n=1}^{k} [i_x(n) - \hat{i}_x(n)]^2}{k-2}}, \quad (24)$$

where $$\hat{i}_x(n) = \Delta a_x i_{x+1}(n) + \Delta b_x. \quad (25)$$

Values of $i(x,y,z_{ref})$ that satisfy the condition $|i_x(n) - \hat{i}_x(n)| > T_s$ are determined 56, these values are not statistical outliers. The outlier threshold $T_s$ is proportional to $s_e$ and is typically set equal to $3s_e$. Two new columns of pixel values, $i_x(n)$ and its adjacent pixel $i_{x+1}(n)$ are generated 48 for each row x, where only the $j \leq k$. The slope $\Delta a_x$ and offset $\Delta b_x$ for Eq. (7) are now determined 60 by $$\Delta a_x = \frac{j \sum_{n=1}^{j} i_{x+1}(n) i_x(n) - \sum_{n=1}^{j} i_{x+1}(n) \sum_{n=1}^{j} i_x(n))}{j \sum_{n=1}^{j} i^2_{x+1}(n) - \left(\sum_{n=1}^{j} i_{x+1}(n)\right)^2} \quad (26)$$

$$\Delta b_x = \frac{\sum_{n=1}^{j} i_x(n) - \Delta a_x \sum_{n=1}^{j} i_{x+1}(n)}{j}. \quad (27)$$

The final statistical tests performed 52 are to determine if the slope $\Delta a_x$ is statistically different from unity and the offset $\Delta b_x$ is statistically different from zero. These tests are performed to ensure that the difference in the response curves estimated for detectors $d_x$ and $d_{x+1}$ are statistically different. If they are not statistically different, then using the estimates for $\Delta a_x \neq 1$ and $\Delta b_x \neq 0$ may add streaking to the image rather than remove it, hence degrading the quality of the image rather than improving it.

A statistical hypothesis test is used to determine if the slope $\Delta a_x$ is statistically different from unity. The t statistic is given by $$t_{\Delta a_x} = \frac{|\Delta a_x - 1|}{\frac{s}{s_i}} \quad (28)$$

where $$s = \frac{\sqrt{\left\{\sum_{n=1}^{j} i^2_x(n) - \frac{\left[\sum_{n=1}^{j} i_x(n)\right]^2}{j}\right\} - \Delta a_x \left\{\sum_{n=1}^{j} i_{x+1}(n) i_x(n) - \frac{\sum_{n=1}^{j} i_{x+1}(n) \sum_{n=1}^{j} i_x(n)}{j}\right\}}}{j-2} \quad (29)$$

$$s_i = \sqrt{\sum_{n=1}^{j} i^2_{x+1}(n) - \frac{\left[\sum_{n=1}^{j} i_{x+1}(n)\right]^2}{j}}. \quad (30)$$

The t statistic is compared to the t distribution value $t_{\alpha/2}$ to determine if $\Delta a_x$ is statistically different from unity. If $t_{\Delta a_x} < t_{\alpha/2}$ then $\Delta a_x$ is not statistically different from unity hence a value of 1 is used 54 for $\Delta a_x$ in Eq. (7). The value used for $t_{\alpha/2}$ depends on the number of sample points j as well as the confidence level desired for the statistical test, which is given by $100(1-\alpha)\%$. For a 95% confidence and $$j > 50, t_{\frac{\alpha}{2}} = 1.96.$$

To determine if the offset $\Delta b_x$ is statistically different from zero, the t statistic is given by $$t_{\Delta b_x} = \frac{|\Delta b_x|}{s\sqrt{\frac{\sum_{n=1}^{j} i_{x+1}^2(n)}{j}}} \cdot \frac{1}{s_i} \qquad (31)$$

If $t_{\Delta b_x} < t_{\alpha/2}$ then $\Delta b_x$ is not statistically different from zero hence a value of 0 is used 56 for $\Delta b_x$ in Eq. (7).

Finally, the pixels $i(x+1,y,z_{ref})$ in column x are modified by Eq. (7) to remove the streaks 58. The procedure outlined above is repeated for the next column of image data. This process is continued until all columns of the image data have been processed in the reference band. This process is then repeated for each band of the spectrally transformed image. Once each band of the spectrally transformed image is streak-removed, the inverse spectral transformation 60 is applied $$\tilde{i}(x,y,z) = \tilde{A}^{-1} \tilde{i}'(x,y,z') \qquad (32)$$

where $\tilde{A}^{-1}$ is the $N_{band} \times N_{band}$ inverse transformation matrix, and the corrected digital image 24 is output. In the preferred embodiment for a three-band color image, the inverse spectral transform is:

$$i(x,y,1) = i'(x,y,1) + 1.402 i'(x,y,3) \qquad (33)$$

$$i(x,y,2) = i'(x,y,1) - 0.34414 i'(x,y,2) - 0.71414 i'(x,y,3) \qquad (34)$$

$$i(x,y,3) = i'(x,y,1) + 1.772 i'(x,y,2). \qquad (35)$$

The invention has been described with reference to a preferred embodiment. However, it will be appreciated that variations and modifications can be effected by a person of ordinary skill in the art without departing from the scope of the invention.

Parts List 2 streaks
4 banding
6 scene variation
8 image artifact
10 digital sensor
12 digital image
14 detector equalization
16 equalized image
18 streak removal operation
20 corrected digital image
22 image processing and enhancements
24 final processed image
28 transform multi-band data to spectrally advantageous space step
30 selecting two adjacent columns of pixels step
32 create two columns of adjacent pixel values step
34 calculate local means step
35 mask used for testing pixel relationship
36 Calculate correlation between bands step
37 calculate local difference metric step
38 remove pixel values from columns of pixel values that exceed thresholds step
39 line from linear regression
40 determine initial estimate of slope step
42 determine initial estimate of offset step
43 statistical outliers
44 calculate standard error of linear regression step
45 statistical outlier boundary
46 determine statistical outliers step
48 remove statistical outliers from columns of pixel values step
50 determine new estimate of slope and offset step
52 determine t statistics for slope and offset step
54 set slope to unity if not statistically different from unity step
56 set offset to zero if not statistically different from zero step
58 remove streaking using slope and offset values step

What is claimed is:

1. A method of removing streaks from multi-band digital images in an original spectral space, said method comprising the steps of:

a) acquiring multiple images, each image acquired at a different spectral band by using a multi-band sensor system;

b) selecting a plurality of bands from the acquired spectral bands of step (a), to perform the streak removal operation upon;

c) transforming each of the bands from an original spectral space of the spectrum to a spectral space of the spectrum advantageous for streak removal for multi-band imagery; and d) performing a streak removal operation on each band in the advantageous spectral space using information from the other spectral bands.

2. The method as claimed in claim 1 wherein the spectral space advantageous for streak removal for multi-band imagery is dependent on at least one of the number of the bands of data, the spectral bandpass of each of the imaging bands, and imaging band dependent characteristics of the one or more sensors used to capture the bands.

3. The method as claimed in claim 1 wherein the transformation performed in step c) is a linear combination of the original bands.

4. In a method of removing columnar streaks from a multi-band digital image of the type in which it is assumed that pixels in a predetermined region near a given pixel spatially and spectrally relative to the spectrum, are strongly related to each other, and employing gain and offset values to compute streak removal information, the improvement comprising: transforming the pixels of the multi-band image to a spectral space of the spectrum advantageous for streak removal, wherein the transformation is a linear combination of at least two of the original bands, and testing for a strong relationship between the pixels in the predetermined region and computing streak removal information only if such a strong relationship exists, whereby image content that does not extend the full length of the image in the column direction will not be interpreted as a streak, and wherein the at least two of the original bands are acquired by using a multi-band sensor system.

5. A method of removing streaking in a multi-band digital image in an original spectral space of the spectrum, said method comprising the steps of:

a) acquiring multiple images, each image acquired at a different spectral band by using a multi-band sensor system; and transforming at least two of the different spectral bands to a spectral space of the spectrum advantageous for streak removal for multi-band imagery, thereby forming a transformed image;

b) detecting pixel locations in the transformed image where pixel-to-pixel differences caused by streaking can be distinguished from normal variations in the scene data;

c) performing a linear regression to determine an initial estimate of the gain and offset values between each pair of adjacent pixels in a direction perpendicular to the streaking using the pixel values at the detected locations;
d) performing a statistical outlier analysis to remove the pixel values that are not from streaking;
e) performing a linear regression to determine the gain and offset values between each pair of adjacent pixels in a direction perpendicular to the streaking using the pixel values at the detected locations that are not statistical outliers;
f) setting the slope value to unity if it is not statistically different from unity;
g) setting the offset value to zero if it is not statistically different from zero;
h) using the slope and offset values to remove streaking from the corresponding line of image data; and
i) transforming the streak removed transformed image from the advantageous spectral space back to the original spectral space.

6. A method for removing columnar streaks in a multi-band digital image, comprising the steps of:
a) acquiring multiple images, each image acquired at a different spectral band by using a multi-band sensor system; and transforming at least two of the different spectral bands from an original spectral space of the spectrum to a spectrally advantageous space of the spectrum, thereby forming a transformed digital image;
b) selecting first and second adjacent columns of pixels from the transformed digital image;
c) forming a column of pixel value pairs, representing the pixel values of the adjacent pixels in the two columns;
d) forming columns of local mean values, representing the mean values of pixels in an N-pixel window for each column;
e) forming columns of mean-reduced values, representing the pixel value minus the corresponding local mean values in each column;
f) calculating the correlation between the bands in the local region;
g) forming a column of difference metric values, representing the sum of the squares of the difference between corresponding mean reduced values in an N-pixel window;
h) forming a first reduced column of pixel value pairs by removing from the column of pixel value pairs, those pixel values whose absolute difference between the pairs is greater than a predetermined difference threshold;
i) forming a second reduced column of pixel value pairs by removing from the first reduced column of pixel value pairs, those pixel values whose corresponding difference metric values are greater than a predetermined difference metric threshold;
j) forming first slope, offset, and standard error values by performing a linear regression between the pair of pixel values in the second reduced column of pixel value pairs;
k) forming a column of linear prediction values using the slope and offset values and the first pixel value of the pair of pixel values in the second reduced column of pixel value pairs;
l) forming a column of regression error values, representing the difference between the second pixel value of the pair of pixel values in the second reduced column of pixel value pairs and the corresponding linear regression prediction value;
m) forming a third reduced column of pixel value pairs by removing from the first reduced column of pixel value pairs, those pixel values whose corresponding regression error values are greater than a predetermined regression error threshold related to the standard error value;
n) forming second slope and offset values by performing a linear regression between the pair of pixel values in the third reduced column of pixel value pairs;
o) setting the second slope value equal to unity if it is determined to not be statistically different from unity;
p) setting the second offset value equal to zero if it is determined to not be statistically different from zero;
q) adjusting the value of each pixel in the second column of pixels in the digital image by multiplying each value by the second slope value and then subtracting the second offset value;
r) repeating steps a–o for all adjacent columns of pixel values in the image; and
s) transforming the multi-band data back to the original spectral space.

7. The method as claimed in claim 1 further comprising:
e) transforming the streak removed bands from the advantageous spectral space back to the original spectral space.

8. A method of removing streaking in a digital image having a plurality of spectral bands, said method comprising the steps of:
transforming the image from a first spectral space of the spectrum to a second spectral space of the spectrum, said second spectral space being advantageous for streak removal, thereby forming a transformed image;
detecting pixel locations in the transformed image where pixel-to-pixel differences caused by streaking can be distinguished from normal variations in the scene data;
removing streaking from the image data to provide a streak removed transformed image; and
transforming the streak removed transformed image from the second spectral space back to the first spectral space;
wherein transforming the image from the first spectral space to the second spectral space includes
a) acquiring multiple images, each image acquired at a different spectral band by using a multi-band sensor system; and
b) selecting a plurality of bands from the acquired spectral bands of step (a), to perform the streak removal operation.

9. The method of claim 8 wherein said removing streaking further comprises the steps of:
performing a linear regression to determine an initial estimate of the gain and offset values between each pair of adjacent pixels in a direction perpendicular to the streaking using the pixel values at the detected locations;
performing a statistical outlier analysis to remove the pixel values that are not from streaking;
performing a linear regression to determine the gain and offset values between each pair of adjacent pixels in a direction perpendicular to the streaking using the pixel values at the detected locations that are not statistical outliers;

setting the slope value to unity if it is not statistically different from unity;

setting the offset value to zero if it is not statistically different from zero; and using the slope and offset values to remove streaking from the corresponding line of image data.

10. A method for removing columnar streaks in a multi-band digital image, comprising the steps of:

transforming the multi-band data from a first spectral space of the spectrum to a spectrally advantageous second spectral space of the spectrum, thereby forming a transformed digital image;

processing all adjacent columns of pixel values in said image to remove streaking; and transforming the multi-band data back to the first spectral space;

wherein transforming the multi-band data from the first spectral space to the second spectral space includes a) acquiring multiple images, each image acquired at a different spectral band by using a multi-band sensor system; and b) selecting a plurality of bands from the acquired spectral bands of step (a), to perform the streak removal operation.

11. The method of claim 10 wherein said processing further comprises:

c) selecting first and second adjacent columns of pixels from the transformed digital image;

d) forming a column of pixel value pairs, representing the pixel values of the adjacent pixels in the two columns;

e) forming columns of local mean values, representing the mean values of pixels in an N-pixel window for each column;

f) forming columns of mean-reduced values, representing the pixel value minus the corresponding local mean values in each column;

g) calculating the correlation between the bands in the local region;

h) forming a column of difference metric values, representing the sum of the squares of the difference between corresponding mean reduced values in an N-pixel window;

i) forming a first reduced column of pixel value pairs by removing from the column of pixel value pairs, those pixel values whose absolute difference between the pairs is greater than a predetermined difference threshold;

j) forming a second reduced column of pixel value pairs by removing from the first reduced column of pixel value pairs, those pixel values whose corresponding difference metric values are greater than a predetermined difference metric threshold;

k) forming first slope, offset, and standard error values by performing a linear regression between the pair of pixel values in the second reduced column of pixel value pairs;

l) forming a column of linear prediction values using the slope and offset values and the first pixel value of the pair of pixel values in the second reduced column of pixel value pairs;

m) forming a column of regression error values, representing the difference between the second pixel value of the pair of pixel values in the second reduced column of pixel value pairs and the corresponding linear regression prediction value;

n) forming a third reduced column of pixel value pairs by removing from the first reduced column of pixel value pairs, those pixel values whose corresponding regression error values are greater than a predetermined regression error threshold related to the standard error value;

o) forming second slope and offset values by performing a linear regression between the pair of pixel values in the third reduced column of pixel value pairs;

p) setting the second slope value equal to unity if it is determined to not be statistically different from unity;

q) setting the second offset value equal to zero if it is determined to not be statistically different from zero;

r) adjusting the value of each pixel in the second column of pixels in the digital image by multiplying each value by the second slope value and then subtracting the second offset value; and repeating steps e–r for all adjacent columns of pixel values in the image.

* * * * *